UNITED STATES PATENT OFFICE.

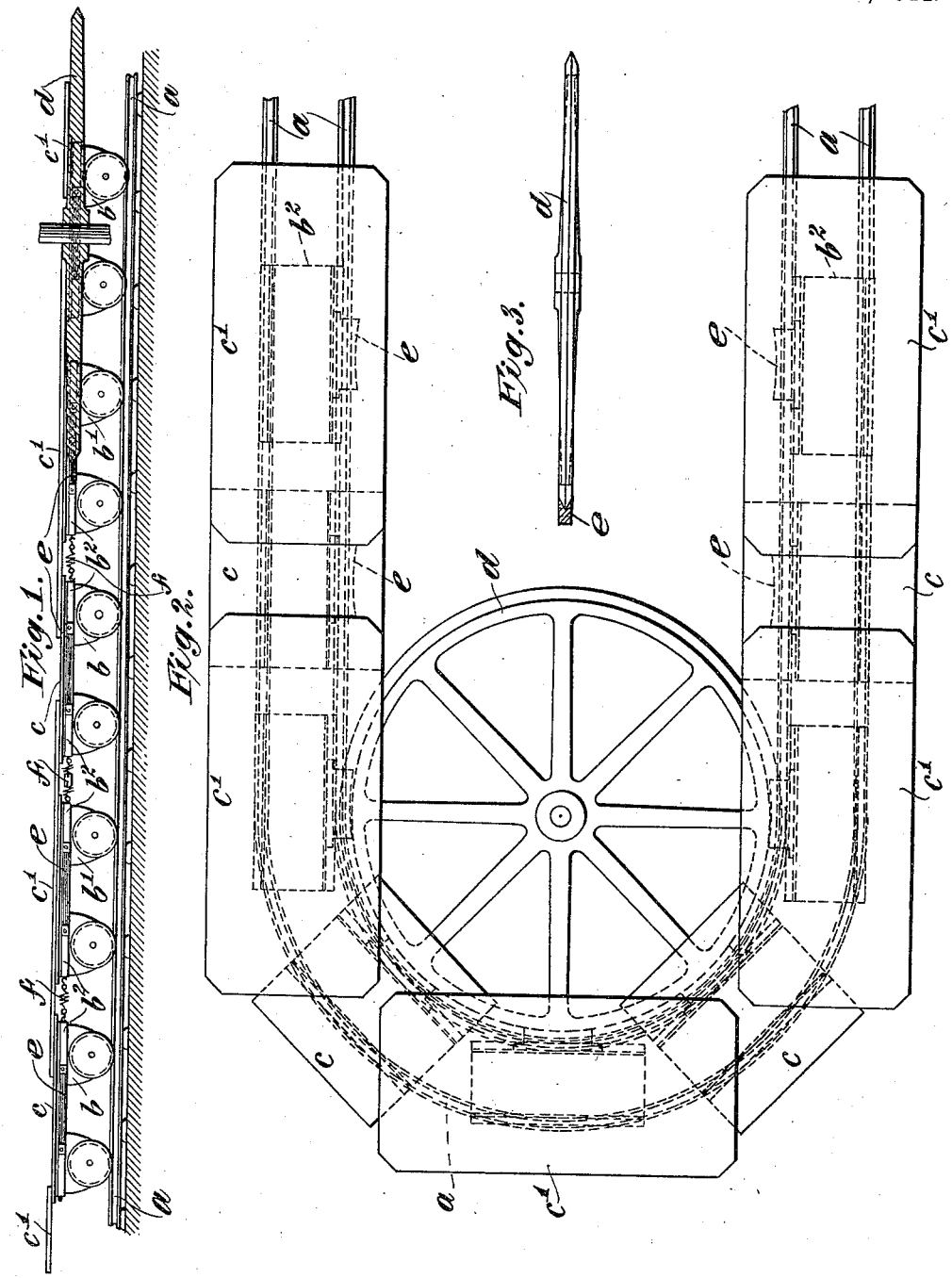

CHARLES W. HUNT, OF NEW YORK, N. Y.; KATHARINE H. HUNT EXECUTRIX AND CHARLES WALLACE HUNT AND GEORGE S. HUMPHREY EXECUTORS OF SAID CHARLES W. HUNT, DECEASED.

APPARATUS FOR FACILITATING THE DISTRIBUTION OF EXPRESS MATTER, &c.

1,004,688.   Specification of Letters Patent.   Patented Oct. 3, 1911.

Application filed December 30, 1910. Serial No. 600,005.

*To all whom it may concern:*

Be it known that I, CHARLES WALLACE HUNT, a citizen of the United States, residing in Stapleton, in the borough of Richmond of the city of New York, in the State of New York, have invented certain new and useful Improvements in Apparatus for Facilitating the Distribution of Express Matter, &c., of which the following is a specification, reference being had to the accompanying drawing, forming a part hereof.

This invention relates to endless moving platforms, such as are used in the handling and distribution of goods of various kinds, in which a series of cars or trucks mounted upon a circular or other endless railway, and forming an endless series of trucks, constitute an endless platform upon which the goods may be placed at any point and from which they may be removed at any point or upon which they may be permitted to remain until such time as they may be removed conveniently.

It is the object of this invention to provide an extensive surface upon which the goods may be carried without being disturbed, even though some one article should occupy considerable area, and in accordance with the invention the tops of alternate cars are considerably longer than the tops of the intermediate cars and are placed slightly above them so that their ends overlap the tops of the intermediate cars. There is thus formed an available surface made up of a series of units which are separated by so short a distance that there is no danger of the dropping of articles between the trucks at the curves and little likelihood of serious disturbance of any goods upon the apparatus even though they may be hastily and perhaps carelessly placed.

The invention will be more fully explained hereinafter with reference to the accompanying drawing in which it is illustrated and in which—

Figure 1 is a view in longitudinal section, showing so much of the improved apparatus as is necessary to enable the application of the invention to be understood. Fig. 2 is a top view of a portion thereof, on a larger scale, and Fig. 3 is an edge view of one of the guide wheels with one of the grooved bearing blocks in section.

Upon the endless track $a$ are mounted trucks $b$ and $b'$ which are coupled together to form an endless series of trucks. Each alternate truck $b$ is provided with a relatively short top $c$, while each intermediate truck $b'$ is provided with a relatively long top $c'$ which is placed slightly above and which overlaps, at each end, the top of the adjacent truck $b$, the top $c'$ at its ends resting upon the top $c$ of the next adjacent trucks. At the curves or bends of the track are placed horizontal guide wheels or pulleys, one of which is shown at $d$ about which the series of trucks travels. The body $b^2$ of each truck is provided, on the side adjacent to the guide wheels, with a concaved and longitudinally grooved bearing block $e$, so that it fits upon the rim of the guide wheel $d$ to be driven frictionally thereby and assists in holding the wheels of the truck upon the rails while the truck is rounding the curve.

The several trucks are necessarily coupled together to form the endless series, and in order that the tension of the series of trucks shall have no tendency to tilt the trucks as they round the guide wheels, the couplings $f$, by which the trucks are connected, are located in the same plane with the bearing blocks $e$, being directly connected, in the construction shown, with the bodies $b^2$. Any suitable form of coupling may be employed, so far as the present invention is concerned, and in the drawing ordinary link couplings are indicated.

I claim as my invention:

1. An apparatus of the character described, comprising an endless track and an endless series of trucks mounted on said track, alternate trucks having relatively shorter tops rigidly secured thereto and forming parts thereof and the intermediate trucks having rigidly secured thereto and forming parts thereof relatively longer and higher tops which overlap the shorter tops of the alternate trucks.

2. An apparatus of the character described, comprising an endless track, an endless series of trucks mounted on said track, and a horizontal guide wheel, each truck having a concaved bearing block to bear against the rim of the guide wheel.

3. An apparatus of the character described, comprising an endless track, an endless series of trucks mounted on said track, and a horizontal guide wheel, each truck having a concaved bearing block to bear against the rim of the guide wheel, the bearing block being also grooved to receive the rim of the guide wheel.

4. An apparatus of the character described, comprising an endless track, an endless series of trucks mounted on said track, a horizontal guide wheel, concaved bearing blocks on the sides of the tracks adjacent to the guide wheel, and couplings between the trucks in the plane of the bearing blocks.

This specification signed and witnessed this 27" Dec. A. D., 1910.

CHAS. W. HUNT.

Signed in the presence of—
CHARLES HUMPHREY,
W. L. VOORHIS.

Copies of this patent may be obtained for five cents each, by addressing the "Commissioner of Patents, Washington, D. C."